United States Patent [19]

Minoura et al.

[11] Patent Number: 5,007,718

[45] Date of Patent: Apr. 16, 1991

[54] ELECTROCHROMIC ELEMENTS AND METHODS OF MANUFACTURING AND DRIVING THE SAME

[75] Inventors: Jun Minoura; Shigeyuki Takahahi; Hisaki Kato; Toshiyasu Ito; Takaaki Mori; Mamoru Kato; Junichi Shimada, all of Nishikasugai; Katsuaki Okabayashi, Aichi, all of Japan

[73] Assignees: Kabushiki Kaisha Toyota Chuo Kenkyusho, Aichi; Toyoda Gosei Co., Ltd., Nishikasugai, Japan

[21] Appl. No.: 176,708

[22] Filed: Apr. 1, 1988

[30] Foreign Application Priority Data

| Apr. 2, 1987 | [JP] | Japan | 62-82075 |
| Apr. 28, 1987 | [JP] | Japan | 62-105419 |
| Apr. 28, 1987 | [JP] | Japan | 62-105420 |
| Aug. 13, 1987 | [JP] | Japan | 62-202246 |

[51] Int. Cl.⁵ .......................... G02F 1/01; G09G 3/34
[52] U.S. Cl. ..................................... 350/357; 340/785
[58] Field of Search ...................... 350/357; 340/785

[56] References Cited

U.S. PATENT DOCUMENTS

| 4,266,335 | 5/1981 | Matsumoto et al. ........... 350/357 X |
| 4,277,147 | 7/1981 | Arnoldussen ....................... 350/357 |
| 4,448,493 | 5/1984 | Matsudaira et al. ............... 350/357 |
| 4,664,934 | 5/1987 | Ito et al. ................................. 427/38 |
| 4,702,566 | 10/1987 | Tukude .............................. 350/357 |
| 4,741,603 | 5/1988 | Miyagi et al. ..................... 350/357 |
| 4,927,246 | 5/1990 | Ito et al. .............................. 350/357 |

FOREIGN PATENT DOCUMENTS

| 0037050 | 4/1978 | Japan ............................... 350/357 |
| 62-54233 | 9/1987 | Japan . |
| 62-209421 | 9/1987 | Japan . |

OTHER PUBLICATIONS

Pfluger et al., "Discovery of a New Reversible Electrochromic Effect", Appl. Phys. Lett., Nov. 15, 1979, pp. 771-772.

Primary Examiner—Eugene R. Laroche
Assistant Examiner—Michael B. Shingleton
Attorney, Agent, or Firm—Chusman, Darby & Cushman

[57] ABSTRACT

An electrochromic element including a pair of electrochromic bases is provided. Each electrochromic base is defined by a substrate, an electrode layer disposed on the substrate, and a color-forming layer disposed on the electrode layer. The electrochromic bases are superposed such that their respective color-forming layers face each other. A solid electrolyte of ultraviolet-setting type is disposed between the color-forming layers of the electrochromic bases. The method of manufacturing the electrochromic element and the method of driving the same are also disclosed.

11 Claims, 6 Drawing Sheets

FIG. 9

ELECTROCHROMIC ELEMENTS AND METHODS OF MANUFACTURING AND DRIVING THE SAME

FIELD OF THE INVENTION

The present invention relates to electrochromic elements used in various types of displays and dimmers, and a method of manufacturing and driving electrochromic elements.

DESCRIPTION OF THE RELATED ART

The known types of electrolytes used in electrochromic elements are the liquid type wherein an inorganic acid such as hydrochloric acid, sulfuric acid, and others, and a metal salt of an inorganic acid such as sodium perchlorate, lithium perchlorate, and others, are added in water and/or an organic solvent such as acetonitrile, nitrobenzene, nitromethane, and others, and the gel type in which a liquid type is impregnated into water absorbent resin.

With the liquid type of electrolyte mentioned above, the electrolyte may leak if it is not properly sealed; also, the liquid electrolyte may scatter about when the electrochromic element is broken.

Further, with the gel type of electrolyte, a difficulty arises in the process of sealing the electrolyte.

Figure 9:
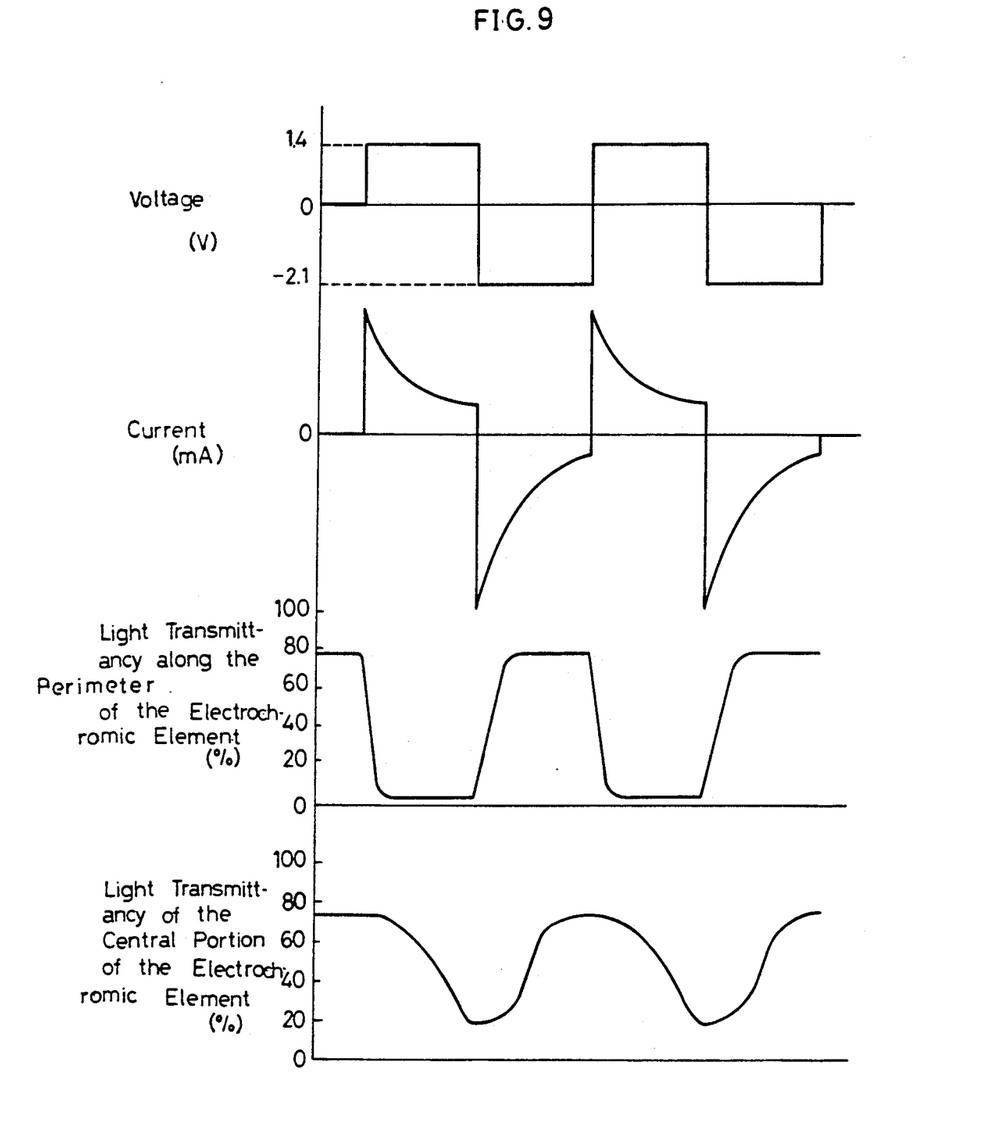
FIG. 9 is a time chart showing the changes in the current that flows into the electrochromic element, the voltage applied to the electrochromic element and the light transmittances along the perimeter and the central portion of the electrochromic element in accordance with the related art.

In a common method of driving an electrochromic element is, as shown in FIG. 9, during coloring, a fixed voltage is quickly applied; during discoloring, a fixed voltage with reverse polarity is quickly applied on the electrochromic element. Thus, in this case, the electrochromic element is driven by a fixed voltage with a square shape. Electrochromic elements with small areas (for example, 100 cm$^2$ or smaller) can be driven effectively through this method.

However, when an electrochromic element with a large area (for example, 100 cm$^2$ or larger) is driven according to the method mentioned above, comparing the changes in the light transmittancies, as shown in FIG. 9, a clearly observed problem is that, during coloring, after the part along the perimeter of the electrochromic element has quickly and densely colored, the central part gradually colors. This is due to the fact that since the electrochromic element has a capacitance, at the rise of the square voltage, a large amount of rush current flows, as shwon in FIG. 9; also, since the transparent electrode used in the electrochromic element has a high sheet resistance, the rush current is concentrated along the perimeter where the lead wires are connected, injecting a large amount of electricity there.

Also, the same problem is encountered during discoloring in that the part along the perimeter of the electrochromic element quickly discolors first.

Further, when an excessive amount of electricity is repeatedly injected along the perimeter, stains and blotches of color are formed along the perimeter, and the life of the electrochromic element is shortened.

SUMMARY OF THE INVENTION

An object of the present invention is to provide an electrochromic element which has improved heat resistance and durability, which prevents leakage of the electrolyte, and which is very safe to use.

Another object of the present invention is to provide a method of manufacturing an electrochromic element wherein the process of sealing the electrochromic base is more effective.

Yet another object of the present invention is to provide a method of driving the electrochromic element wherein, by preventing the injection of an excessive amount of electricity along the perimeter of the electrochromic element, uniformity of coloring or discoloring of the entire electrochromic element during or after color changing is improved.

A further object of the present invention is to provide a method of driving the electrochromic element wherein even with repeated coloring and discoloring, stains or blotches of color do not form along the perimeter of the electrochromic element; thus, the life of the electrochromic element can be lengthened.

To realize the foregoing objects, the electrochromic element of the present invention comprises a pair of electrochromic bases, each comprising a substrate, an electrode layer disposed on the substrate, and a color-forming layer disposed on the electrode layer, the electrochromic bases being superposed such that the color-forming layers face each other; and a solid electrolyte of ultraviolet-setting type, disposed between the color-forming layers of both electrochromic bases.

Other objects of the present invention will become apparent upon a review of the following description of the of the preferred embodiments and the appended claims. Further, many advantages not mentioned in this specification will be apparent to one skilled in the art upon implementation of the present invention.

DETAILED DESCRIPTION OF THE PREFERRED EMBODIMENTS

First embodiment

The first embodiment of the present invention is described below with reference to FIG. 1 to FIG. 4.

Figure 1:
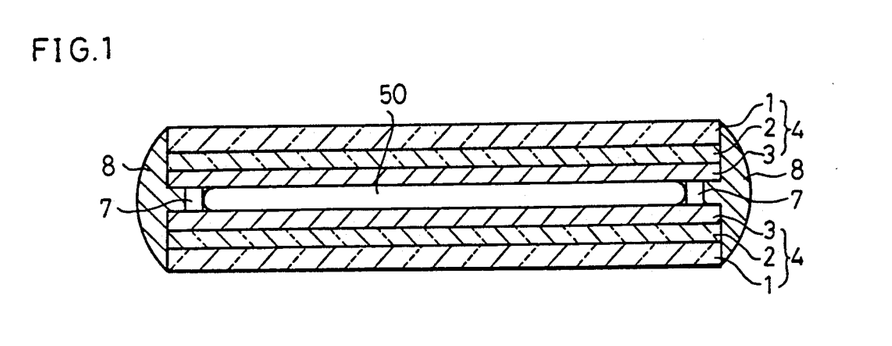
FIG. 1 is a partial sectional view of the electrochromic element of the invention.

As shown in FIG. 1, the electrochromic element comprises two electrochromic bases 4, each comprising a substrate 1 made of transparent glass, an electrode layer 2 and a color-forming layer 3 superposed thereon. The two bases 4 are further superposed, one upside down, with spacers 7 between the color-forming layers 3. The space enclosed by the color-forming layers 3 of the two electrochromic bases 4 and the spacers 7 is filled with a solid electrolyte 50 of ultraviolet-setting type.

The solid electrolyte 50 of ultraviolet-setting type is formed by exposing radiation a liquid electrolyte 5 of ultraviolet-setting type to ultraviolet radiation. The liquid electrolyte 5 of ultraviolet-setting type is a mixture of ultraviolet-setting resin, that hardens through exposure to ultraviolet radiation, having good solubility with a polar organic solvent, and a polar organic solvent containing at least one of lithium perchlorate (LiClO$_4$) and lithium tetrafluoroboric acid (LiBF$_4$). The ultraviolet-setting resin has a photo polymeric prepolymer, a photo polymeric monomer (polymeric solvent) and a photo sensitizer as its main components.

Examples of suitable photo polymeric prepolymers are polyester acrylate, polyurethane acrylate, epoxy acrylate, and the like.

Polyester acrylate is an acrylated ester of a polyhydric alcohol such as ethylene glycol, 1,4-butanediol, 1,6-hexanediol, diethylene glycol, trimethylol propane, dipropylene glycol, polyethylene glycol, polypropylene glycol, pentaerythritol, dipentaerythritol, and others, and a polybasic acid such as phthalic acid, adipic acid, maleic acid, trimellitic acid, itaconic acid, succinic acid, terephthalic acid, alkenyl succinic acid and others. Some examples are as follows:

1. adipic acid/1,6-hexanediol/acrylic acid
CH$_2$=CHCOO(CH$_2$)$_6$[OCO(CH$_2$)$_4$—COO(CH$_2$)$_6$]nOCOCH=CH$_2$ 2. phthalic anhydride/propylene oxide/acrylic acid
CH$_2$=CHCOO[(CH$_2$CH(CH$_3$)O)]

3. trimellitic acid/diethylene glycol/acrylic acid

Epoxy acrylate is a bisphenol A type, novolak type or alicyclic type of epoxy resin esterified in acrylic acid, with a functional group used as an acryloyl group. Some examples are as follows:

1. bisphenol A-epichlorohydrin type/acrylic acid

CH$_2$=CHCOO[CH$_2$CH(OH)CH$_2$O

—CH(OH)CH$_2$OOCHC=CH$_2$ 2. phenol novolak-epichlorohydrin type/acrylic acid 3. alicyclic type/acrylic acid Urethane acrylate is derived from the reaction of a polyol, such as polyester polyol and polyether polyol, and others, with an acrylate containing di- or polyisocyanate and a hydroxyl base. The following is an example.

where HDO is 1,6—hexanediol, TDI is tolylenediisocyanate and HEA is 2-hydroxyethyl acrylate.

Some examples of photo polymeric monomers (polymeric solvents) are as follows:

1. Compounds containing an acryloyl group or a metacryloyl group [hereinafter generally referred to as (meta)acryloyl group], for example, methyl (meta)acrylate, ethyl (meta)acrylate, 2-ethyl hexyl (meta)acrylate, ethylene glycol di(meta)acrylate, and trimethylol propane tri(meta)acrylate.

2. Aromatic monovinyl compounds, for example, styrene, vinyl toluene and α-methyl styrene.

3. Other polymeric compounds, for example, acrylonitrile, vinyl acetate, acrylamide and diacetone acrylamide.

Examples of photo sensitizers (polymerization initiators) are benzoin, benzoin methyl ether, benzoin isopropyl ether, anthraquinone, naphthoquinone, chloranthraquinone, tetramethyl thiuram disulfide, diphenyl disulfide, benzoil peroxide, azobisisobutyronitrile, 2,2-azobispropane, and the like.

Further, the liquid electrolyte 5, of ultraviolet-setting type, used in the present embodiment can be added, as needed, with a polymerization inhibitor, an oxidization inhibitor, a viscosity modifier, and the like.

The appropriate proportion by weight of the combination photo polymeric prepolymer: photo polymeric monomer: photo sensitizer, mentioned above, is within the range of 100:5–250:0.5–30. In other words, when the quantity of the photo polymeric monomer is less than 5, polymerization is insufficient, where the strength is deficient. On the other hand, when it is more than 250, the transparency deteriorates, a cloudy effect results and ion conductivity is lost. The desirable range is from 10 to 250. Also, when the photo sensitizer is less than 0.5, there is deficiency in strength; conversely, when it is more than 30, transparency deteriorates. The desirable range for good transparency and strength is from 1 to 20.

Further, propylene carbonate, ethylene carbonate or γ-butyrolactone is used for the polar organic solvent containing at least one of lithium perchlorate ($LiClO_4$) and lithium tetrafluoroboric acid ($LiBF_4$).

The appropriate proportion by weight of the combination polymeric compound the polar organic solvent containing at least one of lithium perchlorate ($LiClO_4$) and lithium tetrafluoroboric acid ($LiBF_4$) mentioned above is within the range of 1:0.1 to 20. When the polar organic solvent is less than 0.1, ion conductivity tends to decrease; when it is above 20, it becomes difficult for the liquid electrolyte of ultraviolet type to harden completely, resulting in reduced strength. The desirable range is 1:0.1 to 10.

In the electrochromic element having the structure described above, since the expansion coefficient of the solid electrolyte is small, heat resistance and durability are improved; also, there is no leakage of the electrolyte and since the solid electrolyte acts as an adhesive layer, the safety of the device is enhanced.

Next, the method of manufacturing the above-mentioned element is explained.

Figure 2:
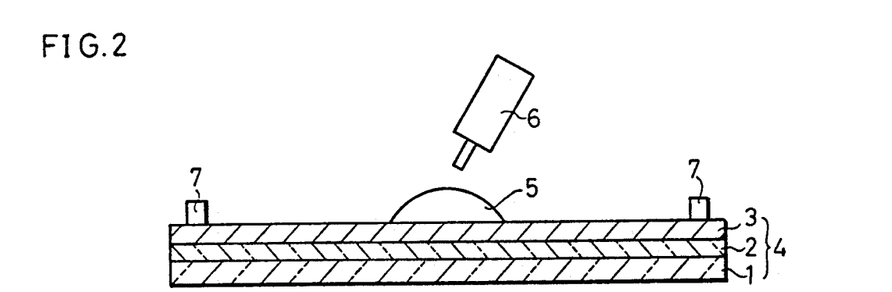
FIG. 2 is a partial sectional view showing the state after a liquid electrolyte of ultraviolet-setting type has been dropped on the electrochromic base.

First, as shown in FIG. 2, the liquid electrolyte 5 of ultraviolet-setting type is dropped from a dispenser 6 on the electrochromic base 4 having the substrate 1 made of transparent glass with the electrode layer 2 and color-forming layer 3 superposed on top of it. The spacers 7 have already been disposed on both extreme parts of the electrochromic base 4.

Figure 3:
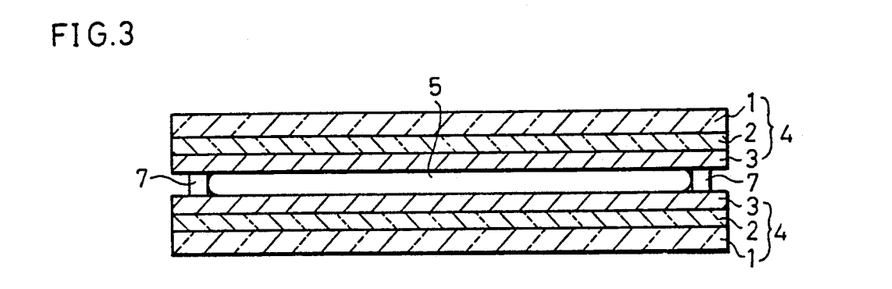
FIG. 3 is a partial sectional view showing the state after the liquid electrolyte has been squeezed between the two electrochromic bases.

Next, as shown in FIG. 3, an electrochromic base 4 similar to the electrochromic base 4 that had the liquid electrolyte of ultraviolet-setting type dropped on it, is superposed upside down on the latter electrochromic base 4. As a result, the liquid electrolyte 5 of ultraviolet-setting type is spread throughout the space between the two electrochromic bases 4 and contained within the space enclosed by the two electrochromic bases 4 and the spacers 7.

Figure 4:
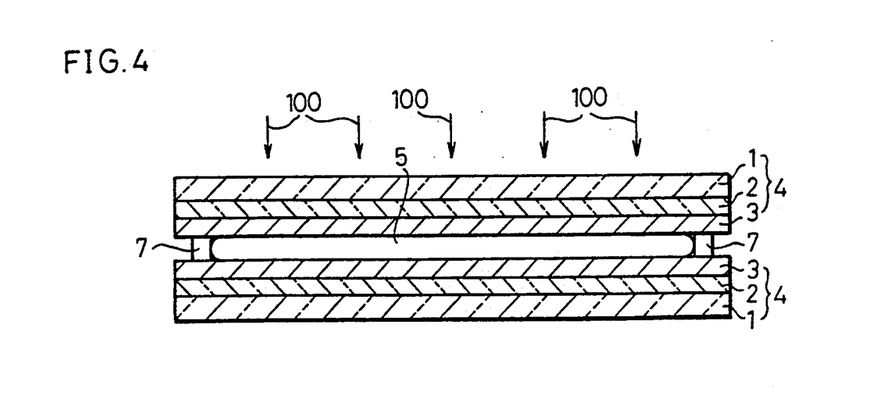
FIG. 4 is a partial sectional view showing the element of FIG. 3 being exposed to ultraviolet radiation.

Further, as shown in FIG. 4, the two electrochromic bases 4 are irradiated from above with ultraviolet rays. Consequently, the liquid electrolyte 5 of ultraviolet-setting type quickly hardens as a result of the polymerization of the polymeric compound and the polymeric solvent.

Finally, as shown in FIG. 1, the extreme portions of the two electrochromic bases 4 are sealed with a sealing material 8 such as epoxy resin, silicon resin, butyl gum or the like. In this way, the desired electrochromic element in the present invention is obtained.

In the electrochromic element described above, a liquid electrolyte of ultraviolet-setting type is disposed between two electrochromic bases 4 and a solid electrolyte is quickly obtained just by irradiation with ultraviolet rays. Further, since sealing of the extreme portions of the electrochromic bases 4 is done after the liquid electrolyte of ultraviolet-setting type has solidified, this sealing process becomes easier and more effective.

Second embodiment

The second embodiment is a more concretized version of the first embodiment described above. A method of manufacturing the electrochromic element and the properties of the electrochromic element obtained with the described method are explained.

(1) Method of forming the color-forming layers 3

1. Method of forming the reductive color-forming layer

After a vacuum chamber is evacuated to a reduced pressure of $1 \times 10^{-5}$ Torr, oxygen gas is introduced into the same vacuum chamber, turning the pressure inside the vacuum chamber to $2.5 \times 10^{-4}$ Torr; after which argon gas is further introduced into the vacuum chamber, turning the pressure inside the vacuum chamber to $5 \times 10^{-4}$ Torr. Next, a glow discharge, with a discharge output of 100 W at a RF of 13.56 MHz (standard frequency) from a high frequency coil, is generated inside the vacuum chamber, and an ITO tablet ($In_2O_3$ containing 5% (proportion by weight) $SnO_2$) is vaporized by irradiation with an electron beam (EB) generated from an EB gun. The vaporized ITO is ionized by the glow discharge, adheres to the surface of a 1 mm thick soda glass substrate 1 and a 2000 Å thick ITO film electrode layer 2 is formed on the substrate 1.

Further, the pressure inside the vacuum chamber is kept at $1 \times 10^{-3}$ Torr by injecting nitrogen gas into it; then, a $WO_3$ tablet (tungstic trioxide) is vaporized by irradiation with an EB generated from an EB gun and, in the same manner mentioned above, a 6000 Å thick $WO_3$ film reductive color-forming layer is formed on the ITO film.

2. Method of forming the oxidative color-forming layer

An electrolytic solution is prepared by mixing equal amounts of an aqueous solution of 0.1N (normal) $HClO_4$ (perchloric acid) and an aqueous solution of 1M (mole concentration) powdered aniline hydrochloride crystals. Next, with the same method used in forming the reductive-color-forming layer mentioned above, an electrode layer 2 made of ITO film is formed on a soda glass substrate. Then, the electrode layer 2, as an anode, and a carbon plate, as a cathode, are immersed in the electrolytic solution and, at room temperature, electrolytic polymerization is performed at a current density of 50 $\mu A/cm^2$ for 30 minutes.

As a result, a green or dark blue 6000 Å thick oxidative color-forming layer made of polyaniline film is formed on the electrode layer 2 made of the ITO anode.

(2) Preparation of the liquid electrolyte of ultraviolet-setting type.

The following three types of compounds, that have good solubility with propylene carbonate, were used as a polymeric compound of ultraviolet-setting type.

1. 60 parts by weight of adipic acid/ethylene glycol polyester acrylate and 20 parts by weight of pentaerythritol acrylate/isophorone diisocyanate urethane acrylate as main components, with 27 parts by weight of 2-hydroxyethyl metacrylate as a diluent and 3 parts by weight of 1-hydroxycyclohexyl phenyl ketone as a polymerization initiator.

2. 60 parts by weight of adipic acid/neopentyl glycol polyester acrylate and 20 parts by weight of pentaerythritol acrylate/isophorone diisocyanate urethane acrylate as main components, with 20 parts by weight of carbitol acrylate as a diluent, 5 parts by weight oftrimethylol propane triacrylate and 5 parts by weight off 1-phenyl-2-methyl-2-hydroxypropane-1-one as a polymerization initiator.

3. 30 parts by weight of polymethyl metacrylate and 20 parts by weight of Epicoat 828 (Shell Chemical Co. trade name) epoxy acrylate as main components, 20 parts by weight of tetrafurfuryl acrylate as a diluent, 25 parts by weight of 2-hydroxyethyl metacrylate, and 5 parts by weight of isobutyl benzoin ether as a polymerization initiator.

The liquid electrolyte of ultraviolet-setting type is derived by mixing at 1:3 proportion by weight of any one of the above-mentioned three types of polymeric compounds of ultraviolet-setting type, and a solution of 1M concentration of at least one of $LiClO_4$ and $LiBE_4$ and propylene carbonate.

(3) Injection of a liquid electrolyte into the cell (the assemblage comprising the two electrochromic bases 4 with the color-forming layers 3 disposed on them).

Spacers 7, 100 μm thick, are pasted along the perimeter of any one of the color-forming layers 3, that is, the reductive color-forming layer or the oxidative color-forming layer, and the liquid electrolyte of ultraviolet-setting type is dropped on the center. Afterwards, the other soda glass substrate 1, with the other color-forming layer 3, is pressed on the former soda glass substrate 1, spreading the liquid electrolyte all throughout.

(4) Hardening of the liquid electrolyte of ultraviolet-setting type by irradiation with ultraviolet rays.

The above-mentioned cell, injected with the liquid electrolyte of ultraviolet-setting type is irradiated with ultraviolet rays using a 80 W/cm², 5 Kw high pressure mercury lamp at a distance of 200 mm, with the cell moving at a speed of 1 m/min on a conveyor. In this way, the liquid electrolyte of ultraviolet-setting type is solidified.

The above-mentioned polymeric compound of ultraviolet-setting type has approximately the same SP (solubility parameter) value as the propylene carbonate; thus, the liquid electrolyte of ultraviolet-setting type containing this compound remains transparent even after hardening.

(5) Sealing of the cell extremities.

An epoxy resin that hardens at normal temperature is used to seal the edges of the cell and is hardened by normal procedures.

The electrochromic element is obtained as a result of the procedure mentioned above.

(6) Determination of the characteristics of the electrochromic element.

By applying a voltage of +1.5 V on the electrode layer 2 connected to the oxidative color-forming layer made of polyaniline film, the transmittancy changed from 80% to 32% after a voltage application time of 1 second after 2 seconds, the transmittancy changed from 80% to 18%.

In the same manner, by applying a square wave voltage with magnitudes +1.2 V and −2.0 V, on the electrode layer 2 connected to the oxidative color-forming layer 3 coloring and discoloring of the electrochromic element was repeated 500,000 times. The decrease in the injected electric quantity was within 10%.

Based on these findings, the characteristics of the electrochromic element of the present embodiment were found to be excellent.

The present embodiment is not limited to the structure described above but can be modified as follows.

Glass beads can be mixed with the electrolyte and used instead of the spacers 7. Also, the solid electrolyte 50 of ultraviolet-setting type can be obtained in a way different from that of the embodiment mentioned above, that is, the liquid electrolyte 5 of ultraviolet-setting type can be injected between the two electrochromic bases 4 after the two bases 4 are superposed with the spacers 7 between them and the edges sealed, then hardened by irradiation with ultraviolet rays.

Third embodiment

The third embodiment of the present invention shows an electrochromic element according to the present invention, used for automobile sunroofs, which is described with reference to FIG. 5 and FIG. 6.

Figure 5:
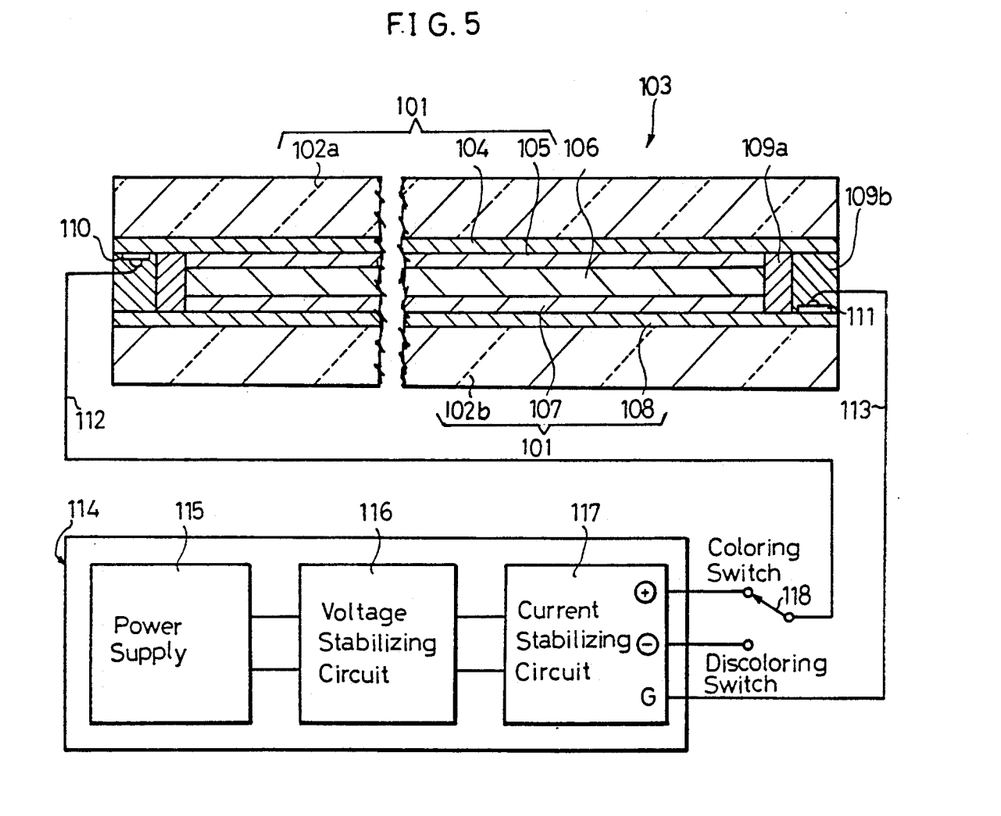
FIG. 5 is a general outline showing an electrochromic element and the electric circuit used in the driving operation.

As shown in FIG. 5, the sunroof of the present embodiment comprises upper and lower substrates 102a, 102b made of reinforced inorganic plate glass (measuring 700 mm×500 mm×2.5 mm), electrode layers 104, 108 (measuring the same as the substrates 102a, 102b), color-forming layers 105, 107 (measuring 400 mm×400 mm, cell area being 1600 mm²), spacer 109a, and electrolyte 106.

The electrochromic element 103 used as a sunroof comprises the following parts superposed together:

1. An upper transparent electrode 104 of ITO (indiumtin oxide) film about 2000 Å thick formed on the lower surface of the upper base 102a, 2. An oxidative color-forming layer 105 of polyaniline film about 6000 Å thick formed by electrolytic polymerization on the lower surface of the upper transparent electrode 104, 3. A lower transparent electrode 108 of ITO film about 2000 Å thick formed on the upper surface of the lower substrate 102b, 4. A reductive color-forming layer 107 of tungsten oxide film about 6000 Å thick formed on the upper surface of the lower transparent electrode 108, and 5. An electrolyte 106 of ultraviolet-setting type which is a mixture with 1:3 proportion by weight of a polymeric compound of ultraviolet-setting type and a solution of 1M concentration of at least one of LiClO₄ and LiBF₄ dissolved in propylene carbonate, the polymeric compound containing 30 parts by weight of polymethyl metacrylate and 20 parts by weight of Epicoat 828 (Shell Chemicals Co. trade name) epoxy acrylate as main components, 20 parts by weight of tetrafurfuryl acrylate as a diluent, 25 parts by weight of 2-hydroxyethyl metacrylate, and 5 parts by weight of isobutyl benzoin ether as a polymerization initiator.

The perimeter of the electrochromic element 103 is sealed with a hard sealing material 109b made of epoxy resin. The transparent electrodes 104, 108 on the upper and lower substrates 102a, 102b have a sheet resistance of about 20 $\Omega/\square$; on one side of these electrodes, conductive pastes 110, 111 are applied and, to these conductive pastes 110, 111, lead wires 112, 113 for the application of the driving voltage are soldered.

Next, to explain the stabilized power source 114 as a driving means for driving the electrochromic element 103, as shown in FIG. 5, the stabilized power source 114 is equipped with a power supply 115, such as a battery, alternator, dynamo, and the like (including a transformer, rectifier, smoothing circuit, and others in the case of an alternating current power source), a voltage stabilizing circuit 116, which is a kind of capacitive load, that keeps the voltage applied on the electrochromic element 103, for coloring and discoloring, approximately constant (specifically, to keep the voltage at or below the prescribed value), and a current stabilizing circuit 117 that keeps the current flowing into the electrochromic element 103 during coloring and discoloring at or below the prescribed value.

The stabilized power source 114 of the present embodiment is adjusted and set up to output a constant voltage of 1.4 V and a 400 mA or less current during coloring and a constant voltage of $-2.1$ V and a 600 mA or less current during discoloring.

Further, the lower transparent electrode 108 of the electrochromic element 103 is connected to the ground terminal (0 V) of the stabilized power source 114 via the lead wire 113; the upper transparent electrode 104 is connected to the positive voltage terminal or the negative voltage terminal of the stabilized power source 114 via the lead wire 112 and the coloring/discoloring changeover switch 118.

Next, the method of driving the electrochromic element 103 with the stabilized power source 114 is described.

(1) Coloring

First, the changeover switch 118 is switched to coloring to apply, on the electrochromic element 103, a coloring voltage kept constant by the voltage stabilizing circuit 116 of the stabilized power source 114. In so doing, in previous cases, a rush current would easily flow into the electrochromic element, it being a capacitive load. However, in the present embodiment, this rush current is prevented since the coloring current is kept at a 400 mA or less current, as shown in FIG. 6, by the current stabilizing circuit 117 of the stabilized power source 114.

Figure 6:
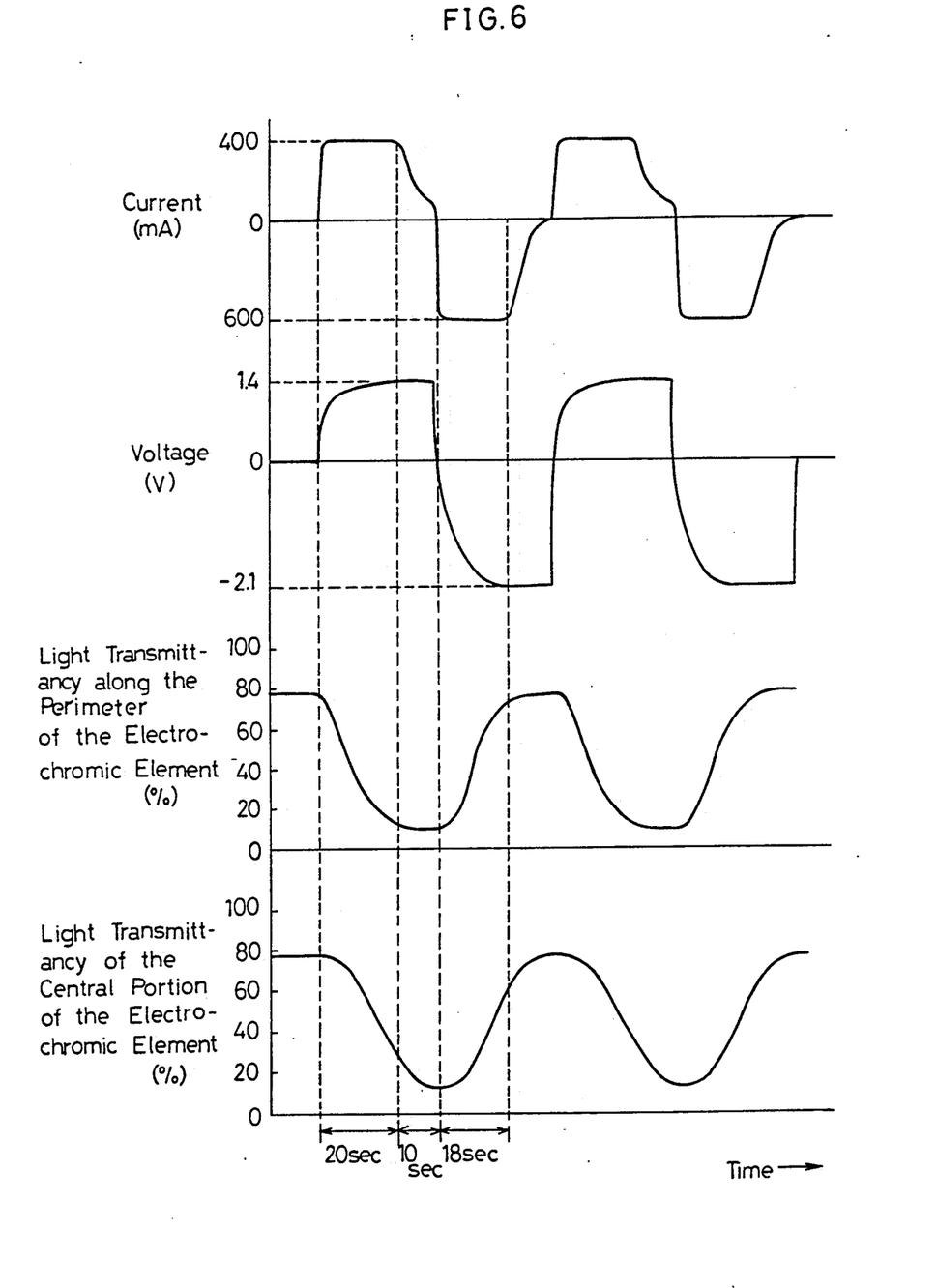
FIG. 6 is a time chart showing the changes in current which flows into the electrochromic element, the voltage applied to the electrochromic element due to the electric circuit in FIG. 5 and the light transmittances along the perimeter and the central portion of the electrochromic element.

Therefore, the injection of an excessive amount of electric quantity along the perimeter of the electrochromic element, as mentioned earlier, is alleviated, and comparing the changes in light transmittancies along the perimeter and the central portion of the electrochromic element 103, as shown in FIG. 6, both the perimeter and the central portion of the electrochromic element color gradually.

About 20 seconds after the application of the coloring voltage, the redox reaction in the electrochromic element 103 becomes saturated, the coloring voltage reaches 1.4 V and becomes constant; then the coloring current starts to decrease, the light transmittancy along the perimeter decreasing to about 10%, at the central portion, about 12%, and the coloring intensity reaches an approximately stable state.

(2) Discoloring

When about 30 seconds has passed after switching the changeover switch 118, the changeover switch is switched to discoloring, and a discoloring voltage, kept constant by voltage stabilizing circuit 116 of the stabilized power source 114, is applied on the electrochromic element 103. As shown in FIG. 6, the current stabilizing circuit 117 of the stabilized power source 114 regulates the discoloring current at 600 mA or lower.

Thus, the injection of an excessive amount of electric quantity along the perimeter of the electrochromic element 103 is alleviated and, comparing the changes in the light transmittancies along the perimeter and the central portion of the electrochromic element 103, as shown in FIG. 6, both the perimeter and the central potion of the electrochromic element 103 discolor gradually.

About 15 seconds after the application of the discoloring voltage, the redox reaction in the electrochromic element 103 becomes saturated, the discoloring voltage reaches $-2.1$ V and becomes constant, then the discoloring current starts to decrease, the light transmittancy along the perimeter increasing to about 78%, at the central portion, to about 76%, and the discoloring intensity reaches an approximately stable state.

As mentioned above, in the present embodiment, the injection of an excessive amount of electricity along the perimeter of the electrochromic element 103 is prevented, thus preventing coloring or discoloring along the perimeter due to excessive redox reaction; as a result, coloring or discoloring progresses and the uniformity of coloring or discoloring of the entire electrochromic element, when coloring or discoloring along the perimeter of the electrochromic element 103 has reached a stable state, is improved.

Further, even with repeated coloring and discoloring, no stains or blotches of color are left along the perimeter; thus the life of the electrochromic element 103 can be lengthened.

The present embodiment is not limited to the described structure and may be modified as in the following examples:

1. In the present embodiment, the driving method was applied specifically to an electrochromic element with an area of 100 cm² or larger and the effect was found to be remarkable; needless to say, this can also be applied to electrochromic elements with smaller areas.

2. The absolute values of the coloring voltage and the discoloring voltage can be kept at the same constant voltage; the coloring current and discoloring current can be kept at the same constant value.

3. The electrochromic element can be embodied as a liquid type or a solid type; the electrochromic element can also be applied in the reflective mode.

Fourth Embodiment

Next, the fourth embodiment of the present invention is described with reference to FIG. 7 and FIG. 8. This embodiment differs from the third embodiment with respect to the driving means and the method of driving.

Figure 7:
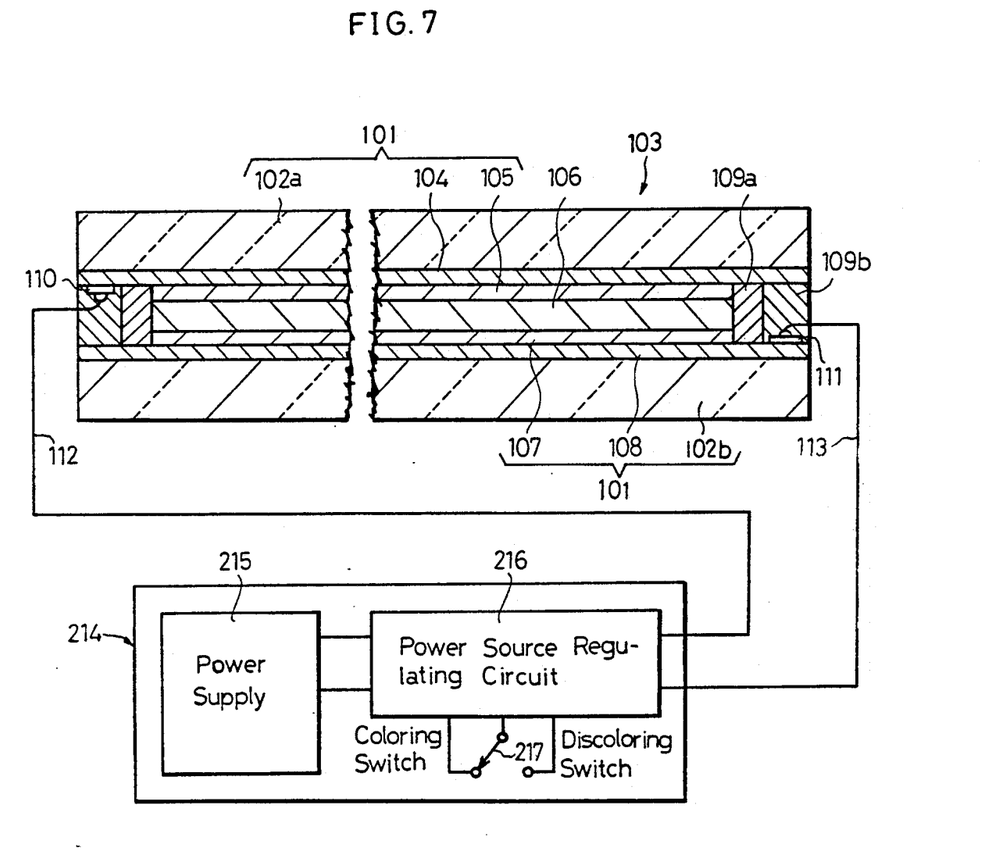
FIG. 7 is a general outline showing the electrochromic element and the electric circuit used in the driving operation in accordance with a further embodiment of the invention.

First, to describe the power source 214 as a driving means for driving the electrochromic element 103, as shown in FIG. 7, the power source 214 is equipped with a power supply 215 such as a battery, alternator, dynamo (including a transformer, rectifier, smoothing circuit, and others in the case of an alternating current power source), and the like, a voltage regulating circuit 216 that gradually increases or decreases the voltage applied on the electrochromic element 103 from one fixed voltage to another fixed voltage, and a changeover switch 217 for switching the circuit 216 to gradually increasing voltage (coloring) or to gradually decreasing voltage (discoloring). For example, a long cycle triangular wave generating circuit can be used for the voltage regulating circuit 216.

In the present embodiment, the power source 214 is regulated and set up such that, during coloring, after the applied voltage has gradually increased linearly from 0 V to 1.4 V in about 20 seconds, the voltage is kept constant at 1.4 V; on the other hand, during discoloring, after the voltage has gradually decreased linearly from 0 V to −2.1 V in about 20 seconds, the voltage is kept constant at −2.1 V. Once the electrochromic element 103 has reached a prescribed intensity, the power source is opened, and with the memory capability of the electrochromic element, the intensity is maintained at a constant level.

The upper and lower transparent electrodes 104, 108 of the electrochromic element 103 are connected to the output terminals of the power source 214 via the lead wires 112, 113.

Next, a method of driving the electrochromic element 103 with the power source 214 is described.

1. Coloring

First, the changeover switch 217 is switched to coloring to effect a gradual increase in voltage by the voltage regulating circuit 216 of the power source 214, thus gradually increasing the voltage applied on the electrochromic element 103.

Figure 8:
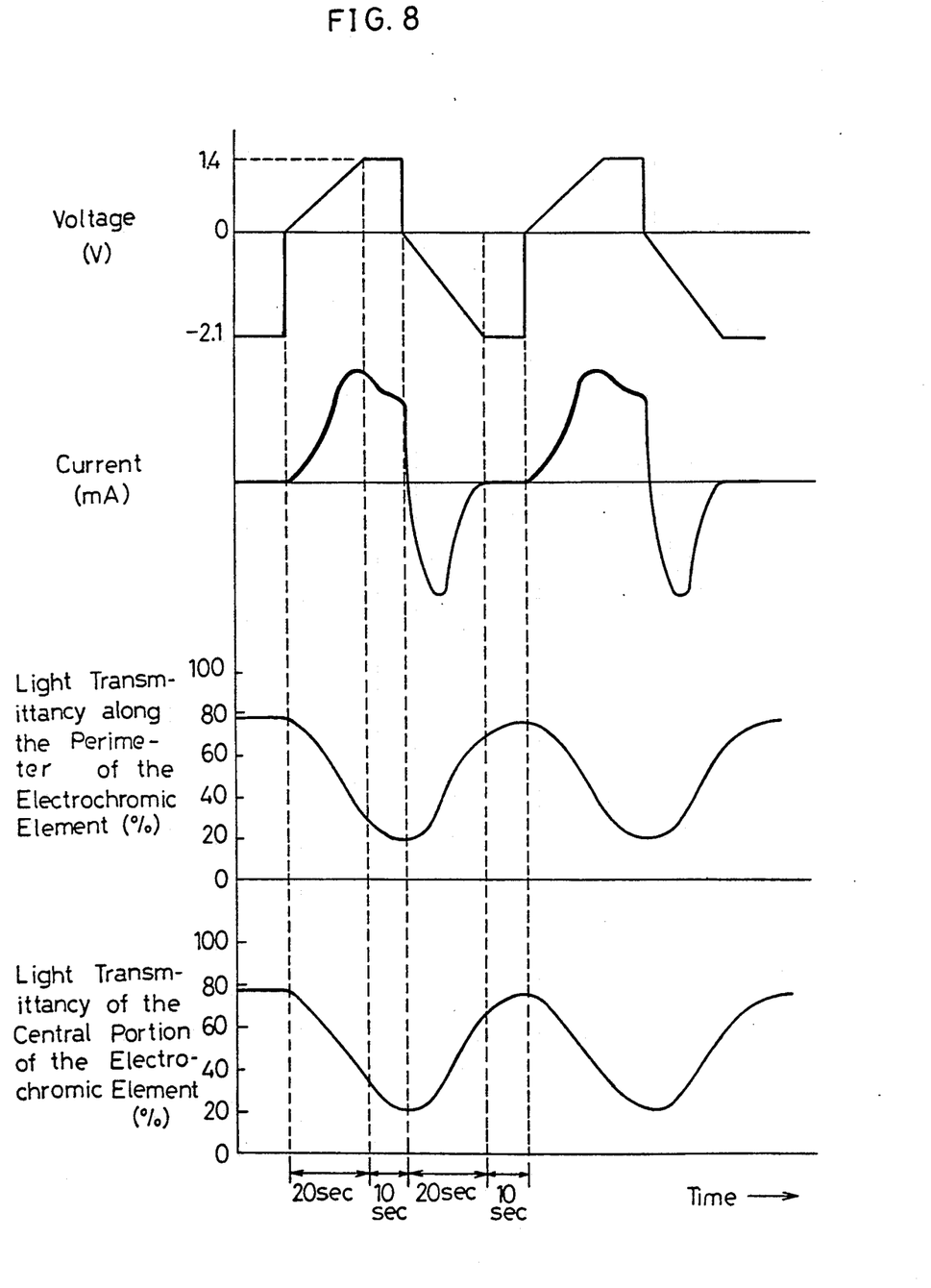
FIG. 8 is a time chart showing the changes in the current that flows into the electrochromic element, the voltage applied to the electrochromic element with the electric circuit of FIG. 7 and the light transmittances along the perimeter and central portion of the electrochromic element.

As a result, the redox reaction in the electrochromic element gradually progresses, and as shown in FIG. 8, the current flowing into the electrochromic element 103 also increases gradually, preventing a rush current.

Thus, the injection of an excessive amount of electricity along the perimeter of the electrochromic element 103 is alleviated and, comparing the changes in the light transmittancies along the perimeter and the central portion of the electrochromic element 103, as shown in FIG. 8, both the perimeter and the central portion of the electrochromic element 103 color gradually.

When about 20 seconds has passed after the application of the coloring voltage, the voltage applied on the electrochromic element 103 is kept constant at 1.4 V, and as the redox reaction in the electrochromic element 103 saturates in due course, the light transmittancy along the perimeter and the central portion drops to about 20%, the coloring intensity reaching an approximately stable state.

2. Discoloring

When about 30 seconds has passed after switching the changeover switch 217, the changeover switch is switched to discoloring to start the gradual decrease in voltage by the voltage regulating circuit 216 of the power source 214, thus gradually decreasing the voltage applied on the electrochromic element 103.

As a result, as shown in FIG. 8, since the applied voltage gradually decreases from 0 V to −2.1 V in about 20 seconds, as in coloring, rush current is prevented.

Thus, the injection of an excessive amount of electricity along the perimeter of the electrochromic element 103 is alleviated and, comparing the changes in the light transmittancies along the perimeter and the central portion of the electrochromic element 103, as shown in FIG. 8, both the perimeter and the central portion of the electrochromic element 103 discolor gradually.

When about 20 seconds has passed after the application of the coloring voltage, the voltage applied on the electrochromic element 103 is kept constant at −2.1 V, and as the redox reaction in the electrochromic element 103 saturates in due course, the light transmittancies along the perimeter and the central portion of the electrochromic element both increase to about 78%, the discoloring intensity reaching an approximately stable state.

As mentioned above, in the present embodiment, the injection of an excessive amount of electricity along the perimeter of the electrochromic element 103 is prevented, thus preventing coloring or discoloring along the perimeter due to excessive redox reaction; as a result, coloring or discoloring progresses and uniformity of coloring or discoloring of the entire electrochromic element, when coloring or discoloring along the perimeter has reached a stable state, is improved.

Further, even with repeated coloring and discoloring, no stains or blotches of color are left along the perimeter, thus the life of the electrochromic element can be lengthened.

The present embodiment is not limited to the structure described above, for example, it can be applied with the following modifications:

1. The driving method in the present embodiment, as in the third embodiment, was applied specifically to electrochromic elements with areas 100 cm$^2$ or larger and the effect was found to be remarkable; needless to say, this can also be applied to electrochromic elements with smaller areas.

2. In the gradual increase or decrease of the voltage applied on the electrochromic element 103, the voltage can change nonlinearly with time.

3. As in the third embodiment, the electrochromic element can be embodied as a liquid type or a solid type; the electrochromic element can also be applied in the reflective mode.

Since it is apparent that the present invention can be applied in a wide range of constructions without departing from the spirit and scope of the invention, the realizations are not limited to the specific embodiments, except as defined in the appended claims.

What is claimed is:

1. An electrochromic element comprising:
    a pair of electrochromic bases, each comprising a substrate, an electrode layer disposed on said substrate, and a color-forming layer dispersed on said electrode layer, said electrochromic bases being superposed such that their respective color-forming layers face each other,
    an ultraviolet-setting solid electrolyte disposed between said color-forming layers of said electrochromic bases, said solid electrolyte being a mixture including an ultraviolet-setting polymeric compound, an organic solvent and an ion conducting salt.

2. An electrochromic element as set forth in claim 1, wherein the ion conducting salt includes at least one of lithium perchlorate ($LiClO_4$) and lithium tetrafluoroboric acid ($LiBF_4$) dissolved in said organic solvent.

3. An electrochromic element as set forth in claim 2, wherein said organic solvent is a polar organic solvent including at least one of propylene carbonate, ethylene carbonate, and ($\gamma$)-butyrolactone, and said polymeric compound has good solubility with said polar organic solvent.

4. An electrochromic element as set forth in claim 3, wherein said mixture comprises 0.1 to 20 parts by weight of said polar organic solvent per one part by weight of said polymeric compound.

5. A method of manufacturing an electrochromic element comprising the steps of:
preparing a pair of electrochromic bases, each comprising a substrate, an electrode layer disposed on said substrate, and a color-forming layer disposed on said electrode layer,
disposing said electrochromic bases so that said color-forming layers face one another,
disposing and maintaining a liquid electrolyte of ultraviolet-setting type between said color-forming layers of said electrochromic bases, said liquid electrolyte including an ultraviolet-setting polymeric compound, an organic solvent and a salt having an ion conductivity,
hardening said liquid electrolyte of ultraviolet-setting type by irradiation with ultraviolet rays, and
sealing the extreme portions of said electrochromic bases.

6. A method of driving an electrochromic element comprising a pair of electrochromic bases, each comprising a substrate, an electrode layer disposed on said substrate, and a color-forming layer disposed on said electrode layer, said electrochromic bases being superposed such that their respective color-forming layers face each other, and
a solid electrolyte of ultraviolet-setting type disposed between said color-forming layers of said electrochromic bases said solid electrolyte being a mixture including an ultraviolet-setting polymeric compound, an organic solvent and an ion conducting salt, the method comprising the step of:
applying one of a gradually increased coloring voltage and a gradually decreased discoloring voltage to said electrochromic element so as to keep one of a coloring current and a discoloring current flowing into said electrochromic element within a predetermined amount.

7. A method of driving an electrochromic element as set forth in claim 6, wherein the respective one of coloring voltage and discoloring voltage is kept constant after applying said one of a gradually increased and a gradually decreased voltage for a prescribed time.

8. A method of driving an electrochromic element as set forth in claim 7, wherein said electrochromic element has an area of 100 $cm^2$ or larger.

9. A method of driving an electrochromic element as set forth in claim 6, wherein said one of a gradually increased coloring voltage and a gradually decreased discoloring voltage is applied through a voltage regulating circuit comprising a long cycle triangular wave generating circuit.

10. A method of driving an electrochromic element comprising a pair of electrochromic bases, each comprising a substrate, an electrode layer disposed on said substrate, and a color-forming layer disposed on said electrode layer; said electrochromic bases being superposed such that their respective color-forming layers face each other, and
a solid electrolyte of ultraviolet-setting type disposed between said color-forming layers of said electrochromic bases said solid electrolyte being a mixture including an ultraviolet-setting polymeric compound, an organic solvent and an ion conducting salt, the method comprising the step of:
applying an approximately constant discoloring voltage to said electrochromic element while a discoloring current flowing into said electrochromic element is kept within a predetermined amount.

11. A method of driving an electrochromic element as set forth in claim 10, wherein said electrochromic element has an area of 100 $cm^2$ or larger.

* * * * *